(12) United States Patent
Wang et al.

(10) Patent No.: US 7,613,365 B2
(45) Date of Patent: Nov. 3, 2009

(54) VIDEO SUMMARIZATION SYSTEM AND THE METHOD THEREOF

(75) Inventors: Jhing-Fa Wang, Tainan (TW); Jia-Ching Wang, Tainan (TW); Chen-Yu Chen, Tainan (TW)

(73) Assignee: National Cheng Kung University, Tainan (TW)

( * ) Notice: Subject to any disclaimer, the term of this patent is extended or adjusted under 35 U.S.C. 154(b) by 685 days.

(21) Appl. No.: 11/486,122

(22) Filed: Jul. 14, 2006

(65) Prior Publication Data

US 2007/0214418 A1      Sep. 13, 2007

(30) Foreign Application Priority Data

Mar. 10, 2006   (TW) .............................. 95108210 A

(51) Int. Cl.
*G06K 9/54* (2006.01)
(52) U.S. Cl. .................. 382/305; 382/197; 382/236; 345/951; 725/115
(58) Field of Classification Search .............. 345/951; 348/130, 133, 134, 138; 382/197, 236, 253, 382/305; 725/115, 145
See application file for complete search history.

(56) References Cited

U.S. PATENT DOCUMENTS 7,296,009 B1 * 11/2007 Jiang et al. ................. 707/3

\* cited by examiner

*Primary Examiner*—Matthew C Bella
*Assistant Examiner*—Gregory F Cunningham
(74) *Attorney, Agent, or Firm*—Sughrue Mion, PLLC

(57) ABSTRACT

The present invention discloses a video summarization system and the method thereof. A similarity computing apparatus computes the similarity between each frame to obtain multiple similarity values. A key frame extracting apparatus chooses the key frames from the frames wherein the sum of the similarity values between the key frames is a minimum. A feature space mapping apparatus converts the sentences into multiple corresponding sentence vectors and computes the distance between each sentence vector to obtain multiple distance values. A clustering apparatus divides the sentences into multiple clusters according to the distance values and the importance of the sentences, and also applies a splitting step to split the cluster with the highest importance into multiple new clusters. A key sentence extracting apparatus chooses multiple key sentence from the clusters, wherein the sum of the importance of the key sentences is the maximum.

27 Claims, 5 Drawing Sheets

VIDEO SUMMARIZATION SYSTEM AND THE METHOD THEREOF

RELATED APPLICATIONS

The present application is based on, and claims priority from, Taiwan Application Serial Number 95108210, filed Mar. 10, 2006, the disclosure of which is hereby incorporated by reference herein in its entirety.

FIELD OF THE INVENTION

The present invention relates to a video summarization system and the method thereof, and more particularly, to a video summarization system and the method to extract key sentences and key frames from a video.

BACKGROUND OF THE INVENTION

With the rapid progress of multimedia and internet technology, digital multimedia contents on the internet, such as digital movies and videos, have increase rapidly in recent years. Although users can choose the movies they are interested via browsing the internet, users cannot make sure if the movies downloaded are what they think owing to the big data size of the videos and the restriction of the limited time and bandwidth of the internet. Users are therefore easily confused and inconvenienced. Therefore, it has become an important issue to set up a fast and effective video summarization system and the method thereof to let users skim over the whole video quickly by browsing the abstract, especially when retrieving and searching for digital videos.

Furthermore, due to the progress in computer technology and the popularity of the internet, increasingly more video information can be retrieved, such as the video data stored in libraries. Hence, there is a demand for the development of a fast and effective retrieval technique that uses key sentences and key frames of the video to help users find the desired videos.

However, conventional techniques to distinguish similar frames analyze the distribution of the color histogram in the video or analyze the similarity of the action in the video, and the frames determined can not be guaranteed to be the most representative frames in the video. The main drawbacks of conventional techniques to extract key sentences are the redundancy of extracted sentences and the failure to cover all of the content.

SUMMARY OF THE INVENTION

Therefore, one objective of the present invention is to provide a video summarization system and the method thereof in which the key representative sentences of the video script are extracted according to the content coverage and the importance of the sentences in the video.

Another objective of the present invention is to provide a video summarization system and the method thereof in which the similarity between the frames in the video are computed by the maximum difference measure (MDM) algorithm and multiple key frames of which the sum of the importance is maximum are chosen therefrom to achieve video summarization.

Still another objective of the present invention is to provide a video summarization system and the method thereof in which users can skim over the essence of the video quickly or grasp the information on the video in a short time.

Still another objective of the present invention is to provide a video summarization method in which an incremental clustering algorithm is used to divide the sentences into multiple clusters according to the distances of the sentence vectors and the importance of the sentences, and multiple key sentences are chosen from the clusters.

Still another objective of the present invention is to provide a video summarization method in which a predetermined cluster number is set and a splitting step is repeated to split the sentences until the number of the clusters reaches the predetermined value.

Still another objective of the present invention is to provide a video summarization method in which the key frames are extracted according to the similarity between the frames in the video.

Still another objective of the present invention is to provide a video summarization method in which a compression ratio, the ratio of the length of the extracted video to the length of the original video, is preset and a certain number of frames are extracted as key frames of the video in accordance with the predetermined compression ratio.

According to the aforementioned objectives, the present invention provides a video summarization method comprising the following steps. First, a video with multiple sentences and multiple frames is provided. Then, a key frame extraction step is carried out on the frames of the video to acquire multiple key frames. The key frame extraction step comprises computing the similarity between each frame to obtain multiple similarity values, and choosing the key frames from the frames, wherein the sum of the similarity values between the key frames is minimum. Then, a key sentence extraction step is carried out on the sentences of the video to acquire multiple key sentences. The key sentence extraction step comprises the following steps. The sentences are converted into multiple corresponding sentence vectors and the distance between each sentence vector is computed to obtain multiple distance values. According to the distance values, the sentences are divided into multiple clusters, wherein the clusters are members of a set. Then, the importance of each sentence in each cluster is computed to obtain the importance of each cluster. A splitting step splits the most important member with the highest importance in the cluster into multiple new clusters, wherein the new clusters replace the original most important member and join the set as members of the set. Afterwards, the splitting step is repeated until the number of the clusters reaches a predetermined value, and at least one key sentence is chosen from each members of the set, wherein the sum of the importance of the key sentences is the maximum. Then, the key frames and the key sentences are output.

According to the preferred embodiment of the present invention, the present invention further comprises dividing the frames of the video into multiple segments according to shots of the video or a unit of length of the video before the step that computes the similarity between each frame. The step that computes the similarity between each frame uses a color histogram similarity algorithm or a mutual information similarity algorithm. In the preferred embodiment of the present invention, the present invention further comprises composing the key frames to form an abstract video. Besides, in the preferred embodiment of the present invention, the present invention further comprises choosing the key frames in accordance with a predetermined compression ratio wherein the predetermined compression ratio is the ratio of the length of the abstract video to the length of the video.

According to the preferred embodiment of the present invention, the step of choosing the key frames is based on a maximum difference measure (MDM) algorithm comprising the following steps. First, the sums of the similarity values are computed, respectively, to obtain multiple operation results. Then, the minimum operation value is found. According to the minimum value, the similarity values resulting in the minimum value are found and further, the key frames with the similarity values are determined.

According to the preferred embodiment of the present invention, the present invention further comprises mapping the sentences to a feature space before the step where sentences are converted into corresponding sentence vectors. The step where the sentences are divided into clusters uses a K-means clustering algorithm, a LBG algorithm, a support vector clustering algorithm or a neural network algorithm. The step where the importance of each sentence of each cluster is computed uses the frequency of each term in the sentences and the location of the sentences in the video and computes the inverse document frequency (IDF) of each term in the sentences multiplied by a term weight. After the splitting step, the present invention further comprises computing the importance of each sentence of the new clusters to obtain the importance of each new cluster. In the preferred embodiment of the present invention, the present invention further comprises a judging step to determine whether the number of the clusters reaches the predetermined value. In the preferred embodiment of the present invention, the present invention further comprises outputting the key frames and the key sentences to a browsing interface to present the key frames and the key sentences.

According to another objective, the present invention provides a video summarization system suitable for extracting multiple key frames and multiple key sentences from a video to form an abstract wherein the video comprises multiple sentences and multiple frames. The video summarization system comprises a similarity computing apparatus, a key frame extracting apparatus, a feature space mapping apparatus, a clustering apparatus and a key sentence extracting apparatus. The similarity computing apparatus is used for computing the similarity between each frame to obtain multiple similarity values. The key frame extracting apparatus is used for choosing the key frames from the frames wherein the sum of the similarity values between the key frames is a minimum. The feature space mapping apparatus is used for converting the sentences into multiple corresponding sentence vectors and computing the distance between each sentence vector to obtain multiple distance values. The clustering apparatus is used to divide the sentences into multiple clusters according to the distance values wherein the clusters are members of a set, and the clustering apparatus further computes the importance of each sentence of each cluster to obtain the importance of each cluster and a splitting step splits the most important member with the highest importance in the cluster into multiple new clusters, wherein the new clusters replace the original most important member and join the set as members of the set. The key sentence extracting apparatus is used to choose at least one key sentence from each member of the set, wherein the sum of the importance of the key sentences is the maximum.

According to the preferred embodiment of the present invention, the present invention further comprises a browsing interface to present the key frames and the key sentences. The clustering apparatus uses a K-means clustering algorithm, a LBG algorithm, a support vector clustering algorithm or a neural network algorithm in the splitting step. The clustering apparatus applies the step where the importance of each sentence of each cluster is computed based on the frequency of each term in the sentences and the location of the sentences in the video. After the clustering apparatus proceeding the splitting step, the clustering apparatus further comprises computing the importance of each sentence of the new clusters to obtain the importance of each new cluster. The clustering apparatus further comprises a judging step to determine whether the number of clusters reaches a predetermined value.

According to another objective, the present invention provides a key sentence extraction method to extract the key sentences in a video wherein the video has multiple sentences. The key sentence extraction method comprises the following steps. First, the sentences are converted into multiple corresponding sentence vectors and the distance between each sentence vectors is computed to obtain multiple distance values. Then, according to the distance values, the sentences are divided into multiple clusters, wherein the clusters are members of a set. Then, the importance of each sentence of each cluster is computed to obtain the importance of each cluster. Afterwards, at least one key sentence is chosen from each members of the set, wherein the sum of the importance of the key sentences is the maximum.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

In order to make the illustration of the present invention more explicit and complete, the following description is stated with reference to FIGS. 1 through 5.

The present invention discloses a video summarization system and the method thereof including the extraction of the key sentences and the key frames. First, to preserve the semantic meaning of the script of the video, the present invention takes both content coverage and sentence importance into account during the extraction of key sentences. Then, to extract key frames to help users quickly scan a video, the present invention extracts the key frames of the video based on the maximum difference measure (MDM) algorithm. Furthermore, the video summarization system of the present invention comprises a browsing interface to present the video with the key frames and the key sentences extracted for the users to browse.

Figure 1:
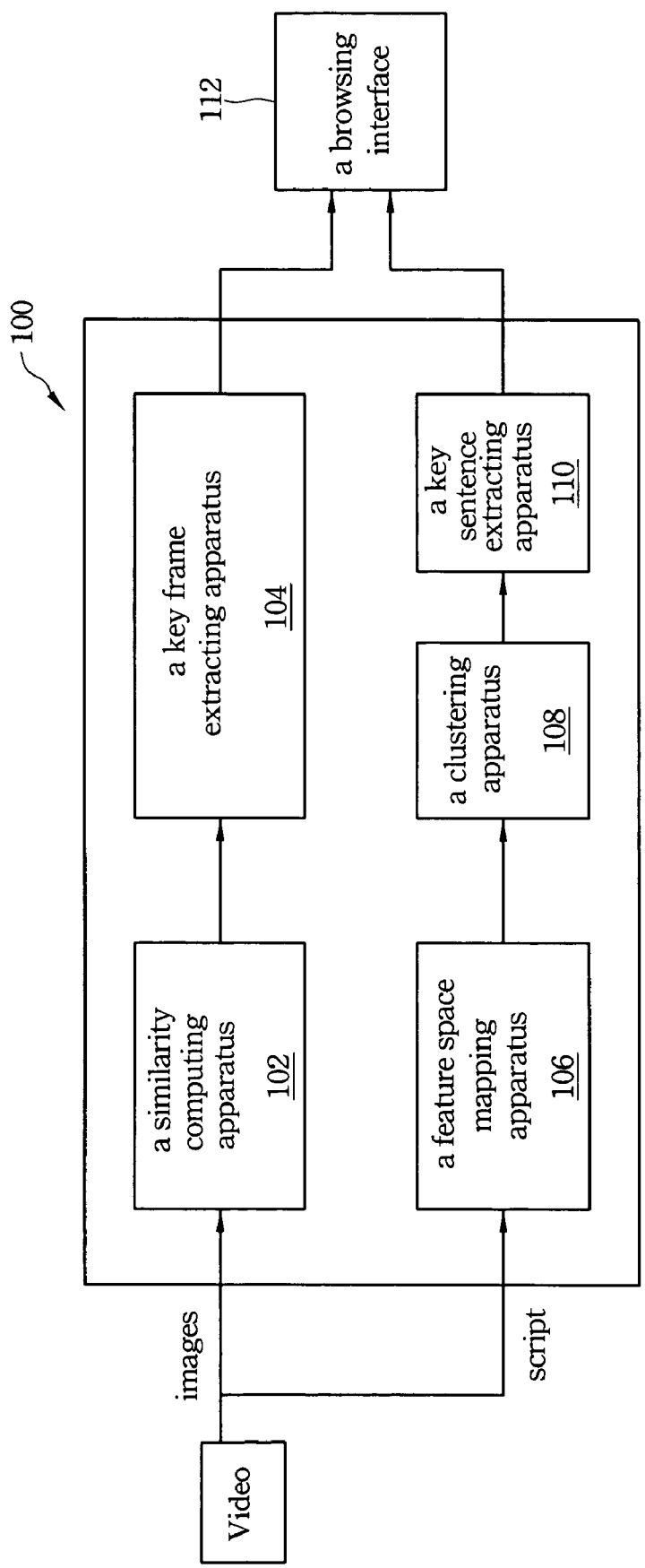
FIG. 1 illustrates a diagram of the video summarization system according to the preferred embodiment of the present invention.

Reference is made to FIG. 1 illustrating a diagram of the video summarization system according to the preferred embodiment of the present invention. As shown in FIG. 1, after inputting multiple frames (images) and multiple sentences (the script) of the video to the video summarization system 100, respectively, the similarity computing apparatus 102 in the video summarization system 100 computes the similarity between each frame of the video to obtain multiple similarity values. Then, the key frame extracting apparatus 104 choose multiple key frames from the frames wherein the sum of the similarity values between the key frames is the minimum.

The video summarization system 100 uses the feature space mapping apparatus 106 to map sentences to a feature space to convert the sentences into multiple corresponding sentence vectors, and to compute the distance between each sentence vector. The clustering apparatus 108 divides the sentences into multiple clusters with a clustering algorithm according to the distances between the sentence vectors and the importance of the sentences, and also splits the cluster with the highest importance until the number of the clusters reaches a predetermined value. Then, the key sentence extracting apparatus 110 chooses multiple key sentences from the clusters, wherein the sum of the importance of the key sentences is the maximum. In the preferred embodiment of the present invention, the key frames and the key sentences are outputted to a browsing interface 112 to present the video with the key frames and the key sentences extracted for the users to browse.

The following describes in detail the key sentence extraction method used in the preferred embodiment of the present invention.

Figure 2:
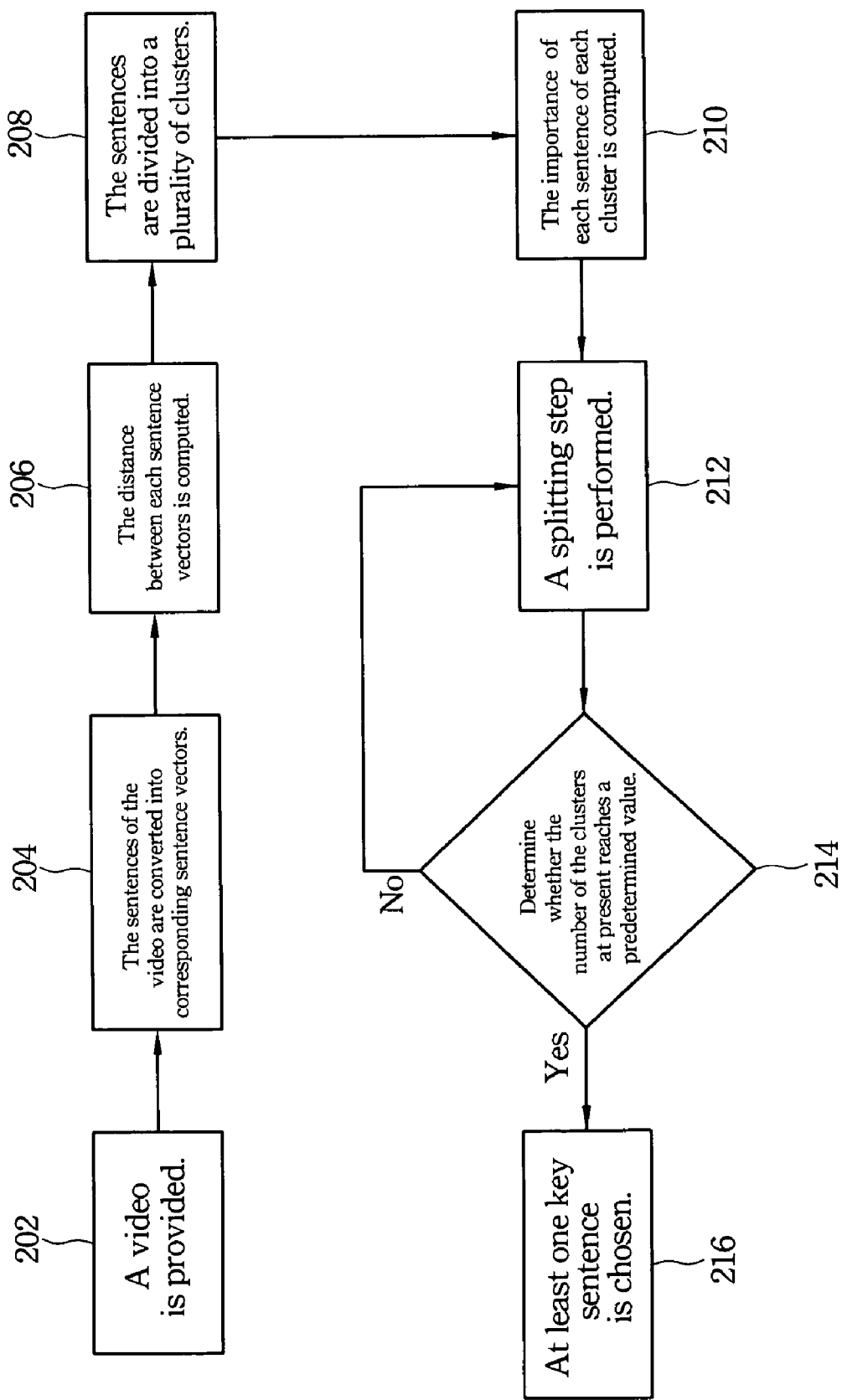
FIG. 2 illustrates a flow diagram of the key sentence extraction method according to the preferred embodiment of the present invention.
Figure 3:
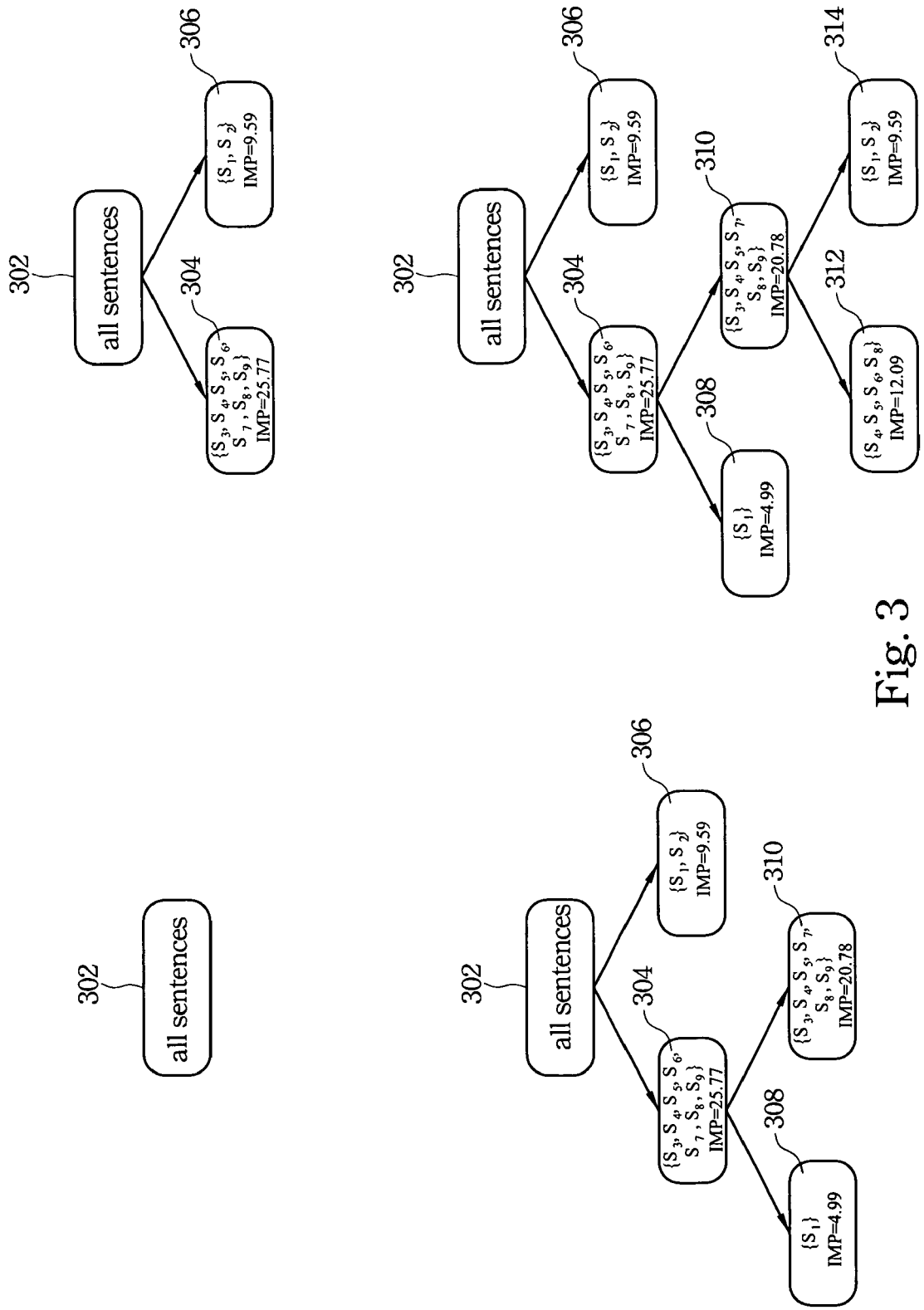
FIG. 3 illustrates the diagram of the incremental clustering algorithm used in the preferred embodiment of the present invention.

Reference is made to FIG. 2 and FIG. 3 illustrating a flow diagram of the key sentence extraction methods according to the preferred embodiment of the present invention and the diagram of the incremental clustering algorithm used in the preferred embodiment of the present invention, respectively. First, a video with multiple sentences and multiple frames is provided in step 202. Then, the sentences are mapped to the feature space. The feature space converts the sentences of the video into multiple corresponding sentence vectors in step 204. Feature space settings can be achieved by using multiple scripts of multiple videos in which the noise is filtered out. The importance of each term in each script is computed first, and then, the terms with higher importance are used as dimensions to set up the feature space. In the preferred embodiment of the present invention, the importance of each term in each script is computed by TFIDF (Term Frequency Inverse Document Frequency) equation as follows:

$$TFIDF(t_k, n_j) = TF(t_k, n_j) \cdot IDF(t_k)$$

where $TF(t_k, n_j)$ denotes the term frequency representing the frequency of term $t_k$ in the script $n_j$ and $IDF(t_k)$ represents the inverse document frequency of the term $t_k$ in the total scripts. If a term exists in many scripts, the inverse document frequency is low. In other words, the inverse document frequency is the highest in the case where a term occurs only in one script. The inverse document frequency is defined as follows:

$$IDF(t_k) = \log \frac{N_n}{DF(t_k)}$$

where $N_n$ denotes the total number of scripts and $DF(t_k)$ is the document frequency representing the number of the scripts involving the term $t_k$.

Then, the distance between each sentence vector is computed to determine the homogeneity among the sentences in step 206. The higher the homogeneity of the sentences, the shorter the distance between the sentence vectors. Then, in step 208, according to the homogeneity, the sentences are divided into multiple clusters, wherein the clusters are members of a set. For example, all sentences 302 are divided into two clusters (cluster 304 and cluster 306) in FIG. 3. In the preferred embodiment of the present invention, the K-means clustering algorithm with K=2 is used, and in other embodiments of the present invention, K can be set to other values. Increasing the K value increases the computation speed of the clusters. Furthermore, other clustering algorithms can also be used, such as a LBG algorithm, a support vector clustering algorithm or a neural network algorithm.

Then, in step 210, the importance of each sentence of each cluster is computed and the importance of the sentence of the same cluster is added together to obtain the importance of each cluster. For example, the importance of cluster 304 is 25.77 and the importance of cluster 306 is 9.59. In the preferred embodiment of the present invention, the importance of each sentence is obtained by computing the inverse document frequency (IDF) of each term in the sentence multiplied by a term weight and in accordance with the following equation:

$$IMP = \sum_j \sum_k g_{jk} \times IDF(t_k, s_j),$$

where $s_j$ represents the sentences in the cluster, $t_k$ represents the term in the sentence and $g_{jk}$ represents the term weight. For an individual sentence, little possibility exists that a term occurs multiple times. Thus, using term frequency as the term weight is not very useful. In truth, the first three sentences usually contain important information in the script. Therefore, it is reasonable to give the terms occurring in the first three sentences in the script higher weights. Hence, in the preferred embodiment of the present invention, the term weight $g_{jk}$ is defined as follows:

$$g_{jk} = \begin{cases} c, & \text{if } t_k \text{ both occurs in } s_j \text{ and in the first three sentences} \\ 1, & \text{if } t_k \text{ only occurs in } s_j \\ 0, & \text{otherwise} \end{cases}$$

where c is greater than 1.

Then, in step 212, the cluster with the highest sum of sentence importance is split, i.e. the most important member with the highest importance in the cluster is split into multiple new clusters. The new clusters replace the original most important member and join the set as members of the set. As shown in FIG. 3, since the importance of cluster 304 (25.77) is greater than the importance of cluster 306 (9.59), the cluster 304 is split into two new clusters (cluster 308 and cluster 310), and the sum of the importance of the sentences in the new clusters are computed to obtain the importance of the new clusters. For the time being, the members of the set are cluster 306, cluster 308 and cluster 310.

Then the next step, step 214, determines whether the number of the clusters at present reaches a predetermined value. The predetermined cluster value can be set by the users. For example, in the preferred embodiment of the present invention, the predetermined cluster value is set to be 8. If the number of the clusters at present has not reached the predetermined value yet, repeat step 212 to continue splitting the clusters until the number of the clusters equals the predetermined value. For example, in FIG. 3, the cluster 310 with the highest importance in the cluster is split into two new clusters (cluster 312 and cluster 314), and the members of the set are cluster 306, cluster 308, cluster 312 and cluster 314.

Then, in step 216, at least one key sentence is chosen from each member of the set. The selected key sentence may be the sentence with the highest importance in the member of the set. Thus, the key sentence extraction method used in the preferred embodiment of the present invention is completed. In other embodiments of the present invention, the key sentence may be the centroid sentence of the cluster.

The key sentence extraction method of the present invention utilizes an incremental clustering algorithm to extract the key sentences from the clusters, respectively, after deciding the number of sentences being extracted. The sum of the importance of the key sentences is the maximum. The redundancy of the key sentences extracted in this way decreases, so the key sentences extracted can be referred to as the representative sentences of the video.

The following describes in detail the key frame extraction method used in the preferred embodiment of the present invention.

Figure 4:
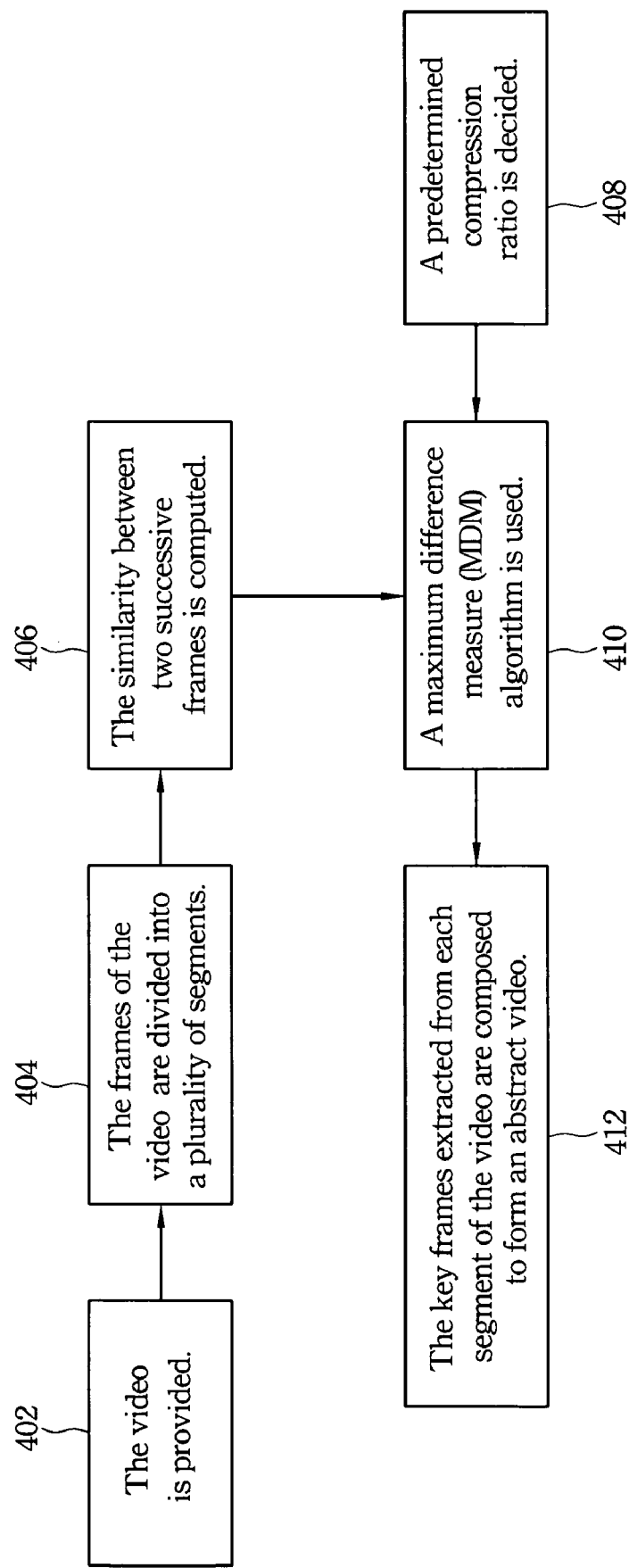
FIG. 4 illustrates a flow diagram of the key frame extraction method according to the preferred embodiment of the present invention.
Figure 5:
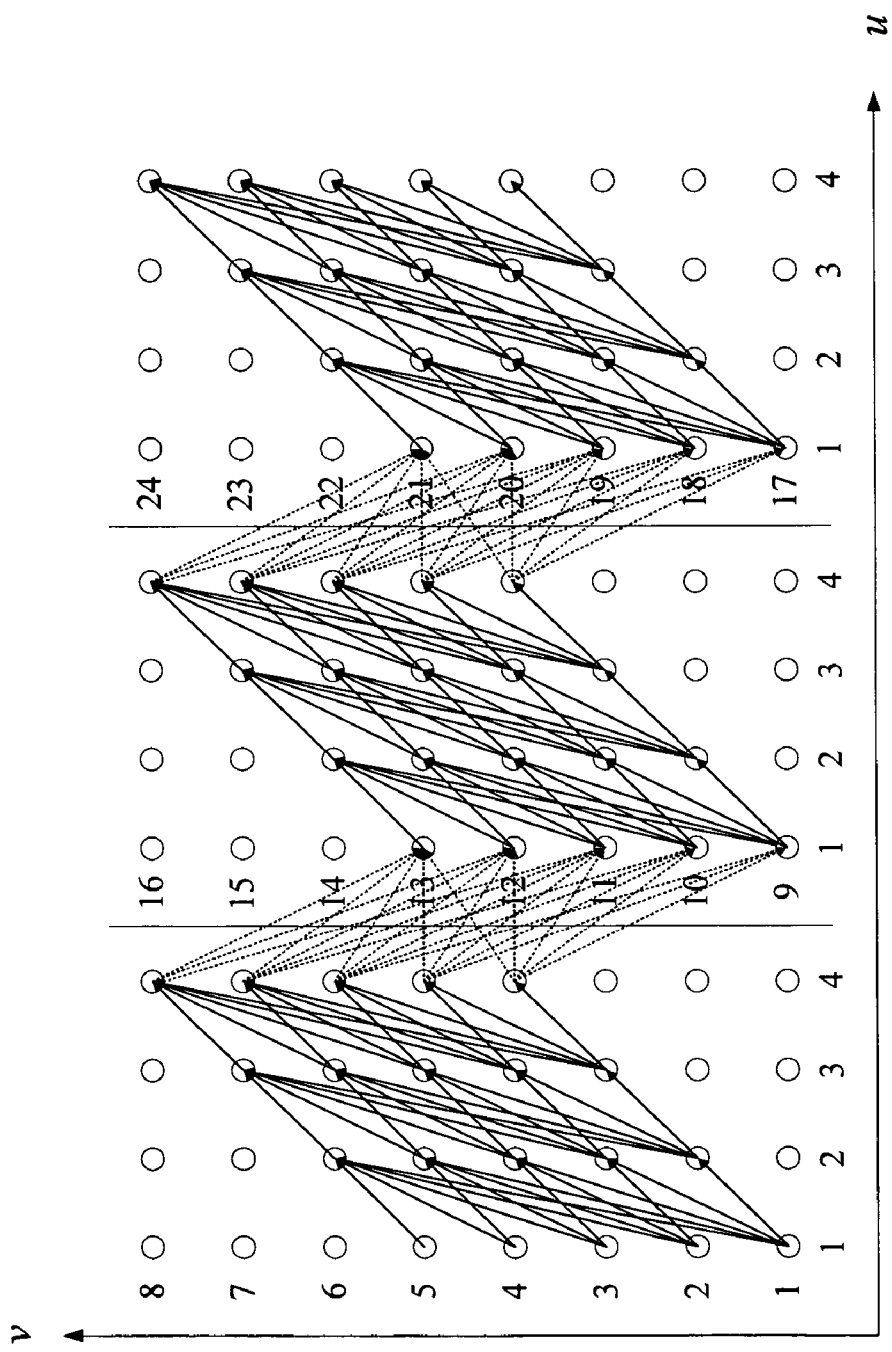
FIG. 5 illustrates the diagram of an example using the key frame extraction method according to the preferred embodiment of the present invention.

Reference is made to FIG. 4 and FIG. 5 illustrating a flow diagram of the key frame extraction method and the diagram of an example using the key frame extraction method according to the preferred embodiment of the present invention. First, in step 402, the video with multiple frames and multiple sentences is provided. Then, in step 404, according to the shots of the video or a unit of length of the video, the frames of the video are divided into multiple segments to decrease the complexity and the computation time. For example, the twenty four frames of the original video are divided into three segments with eight frames each in FIG. 5. It is noted that the length of each segment may or may not be the same. The video can also be divided into several segments with different lengths in other embodiments of the present invention.

Then, in step 406, the similarity between two successive frames is computed in each segment. The method to compute the similarity is not limited and it can be any algorithm that computes the similarity between two frames, such as a color histogram similarity algorithm or a mutual information similarity algorithm. Take the color histogram similarity algorithm as an example, it lists the gray scale of each color of a frame in a histogram form and compares the histograms of two frames to find the similarity between the two frames.

Then, a predetermined compression ratio is selected in step 408. The predetermined compression ratio is the ratio of the length of an abstract video composed of the key frames to the length of the original video. For example, in the preferred embodiment of the present invention, the predetermined compression ratio is 50%, i.e. twelve frames are chosen from the twenty four frames in the original video as the key frames. Furthermore, the predetermined compression ratio can be set by the users in accordance with the bandwidth of the internet or personal preference.

Then, in step 410, according to the predetermined compression ratio, a maximum difference measure (MDM) algorithm is used to extract the key frames from each segment of the video, wherein the sum of the similarity values between the key frames is the minimum. For example, in FIG. 5, given the predetermined compression ratio is 50%, by comparing the similarity between the frames, four key frames of which the sum of the similarity values is the minimum are chosen from the eight frames in each of the three segments of the video to form twelve key frames as the abstract video.

The following describes in detail the maximum difference measure algorithm used in the present invention. Given the number of all frames is V in the original video and the predetermined compression ratio is $1/R_f$, the number of the key frames extracted U is a ceiling function value of $V/R_f$ in the preferred embodiment of the present invention. That is, U is the greatest positive integer most approximate to $V/R_f$ and $U-1<V/R_f \leq U$. In the preferred embodiment of the present invention, when the ratio of U and V is set at 1/200, the best result can be obtained. To estimate the similarity between two successive frames, the similarity based on mutual information of RGB color space is utilized as the measure. The similarity between two frames is defined as:

$$S = \sum_{k \in R,G,B} \sum_{x,y} p_{t,t'}(x, y) \log \frac{p_{t,t'}(x, y)}{p_t(x) p_{t'}(y)}$$

where k means the result of the sum of the R, G, and B component that is used; $p_{t,t'}(x,y)$, a probability matrix, means that a pixel with grey level x in frame t has grey level y in frame t'; $p_t(x)$ determines the number of pixels in frame t with grey scale value x and $p_{t'}(y)$ determines the number of pixels in frame t' with grey scale value y. The grey scale range for x and y is from 0 to 255.

Then, the notation u is used to denote the key frame index, $1 \leq u \leq U$, while v represents the original frame index, $1 \leq v \leq V$. The accumulated similarity is calculated as:

$$S_A(u+1, v) = \min_i \{S_A(u, i) + S(i, v)\}, v - 1 \leq i \leq V - U + u,$$

where $S_A(u+1,v)$ and $S_A(u,i)$ are the accumulated similarity, and $S(i,v)$ is the similarity between the i-th and v-th original frames. The key frames extracted by the maximum difference measure algorithm are as follows:

$$S_{Best} = \min_v [S_A(U, v)],$$

and it denotes that the accumulated similarity between the key frames is the minimum.

As shown in FIG. 5, if the first key frame extracted is the second frame in the first segment of the video, the second frame is then compared with the third, the fourth, the fifth and the sixth frame, respectively, to compute the similarity, as the solid line shown in FIG. 5. Then, the one with the minimum similarity is chosen as the second key frame. The steps are repeated in this way until the twelve key frames of the video are extracted.

It is noted that the extracted frame can not be chosen again in extracting the key frames, and further, since the frames need to be arranged based on the time sequence, it is not allowed to trace back to choose the previous frames. Moreover, in order to reserve the frames for the choice afterwards, every time a key frame is selected, it can only be chosen from part of the frames. For example, in choosing the second key frame, the second key frame can only be chosen from the third, the fourth, the fifth and the sixth frame. The seventh and the eighth frames are reserved in advance for fear that the third and the fourth frames can not be extracted if the second key frame is chosen from the seventh or the eighth frame.

Although the best key frame of a segment can be obtained by the abovementioned method, the redundancy between the segments still exists. To solve this problem, the initial setup $S_A(1,v)=0$ is only used for the first segment of the video specifying that the initial value of the accumulated similarity of the first segment is 0. For the next successive segments after the first segment, the initial setup $S_A(1,v)$ is changed to the following:

$$S_A(1,v)=S(r_U^{t-1},v), 1\leq v\leq V-U+1,$$

where $r_U^{t-1}$ is the last frame in the previous segment, and $S_A(1,v)=S(r_U^{t-1},v)$ represents that in the segments, the initial value of the accumulated similarity is the similarity of the last frame in the previous segment and the v-th frame. The dotted lines in FIG. 5 indicate the possible transitions for the initial setup for the second and the third segments.

Then, the key frames extracted from each segment of the video are composed to form an abstract video as the representative frames of the video, and the key frame extraction in the preferred embodiment of the present invention is complete, as shown in step 412.

According to the aforementioned description, one advantage of the present invention is that the present invention provides a video summarization system in which the key representative sentences of a video script are extracted according to the content coverage and the importance of the sentences in the video and the similarity between the frames in the video are computed by the maximum difference measure algorithm and multiple key frames of which the sum of the importance is maximum are selected to summarize the video.

According to the aforementioned description, another advantage of the present invention is that the present invention provides a video summarization system and the method thereof which can be used in summarizing videos, skimming videos, browsing videos, indexing videos, or retrieving videos to let users obtain the information of the video in a short time.

According to the aforementioned description, yet another advantage of the present invention is that the present invention provides a video summarization method in which an incremental clustering algorithm is used to divide the sentences into multiple clusters according to the distances of the sentence vectors and the importance of the sentences, and multiple key sentences are chosen from the clusters. Thus both the content coverage and the importance of the sentences are considered.

According to the aforementioned description, yet another advantage of the present invention is that the present invention provides a video summarization method in which the key frames are extracted according to the similarity between the frames in the video.

According to the aforementioned description, yet another advantage of the present invention is that the present invention provides a video summarization method in which a compression ratio, the ratio of the length of the extracted video to the length of the original video, is preset and a certain number of frames are extracted as key frames of the video in accordance with the predetermined compression ratio.

As is understood by a person skilled in the art, the foregoing preferred embodiments of the present invention are illustrative of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A video summarization method comprising:
    providing a video wherein the video has a plurality of sentences and a plurality of frames;
    applying a key frame extraction step to the frames of the video to acquire a plurality of key frames, wherein the key frame extraction step comprises:
        computing the similarity between each frame to obtain a plurality of similarity values; and
        choosing the key frames from the frames, wherein the sum of the similarity values between the key frames is the minimum;
    applying a key sentence extraction step to the sentences of the video to acquire a plurality of key sentences, wherein the key sentence extraction step comprises:
        converting the sentences into a plurality of corresponding sentence vectors;
        computing the distance between each sentence vector to obtain a plurality of distance values;
        according to the distance values, dividing the sentences into a plurality of clusters, wherein the clusters are members of a set;
        computing the importance of each sentence of each cluster to obtain the importance of each cluster;
        applying a splitting step to split a most important member with the highest importance in the cluster into a plurality of new clusters, wherein the new clusters replace the original most important member and join the set as members of the set;
        repeating the splitting step until the number of the clusters reaches a predetermined value; and
        choosing at least one key sentence from each members of the set, wherein the sum of the importance of the key sentences is the maximum; and
    outputting the key frames and the key sentences.

2. The video summarization method according to claim 1, further comprising dividing the frames of the video into a plurality of segments before the step of computing the similarity between each frame.

3. The video summarization method according to claim 2, wherein the step of dividing the frames of the video into the segments is based on shots of the video or a unit of length of the video.

4. The video summarization method according to claim 1, wherein the step of computing the similarity between each frame uses an algorithm and the algorithm is selected from the group consisting of a color histogram similarity algorithm and a mutual information similarity algorithm.

5. The video summarization method according to claim 1, further comprising composing the key frames to form an abstract video.

6. The video summarization method according to claim 5, further comprising choosing the key frames in accordance with a predetermined compression ratio wherein the predetermined compression ratio is the ratio of the length of the abstract video to the length of the video.

7. The video summarization method according to claim 1, wherein the step of choosing the key frames is based on a maximum difference measure (MDM) algorithm comprising:
    computing the sums of the similarity values, respectively, to obtain a plurality of operation results;
    finding a minimum value from the operation results; and
    according to the minimum value, finding the similarity values resulting in the minimum value and further determining the key frames having the similarity values.

8. The video summarization method according to claim 7, wherein the step of computing the sums of the similarity values, respectively, to obtain the operation results is based on an equation:

$$S_A(u+1, v) = \min_i \{S_A(u, i) + S(i, v)\}, v - 1 \leq i \leq V - U + u,$$

where v represents the index of the frames, V represents the number of the frames, u represents the index of the key frames, U represents the number of the key frames, $S_A(u+1,v)$ represents one of the operation results, $S_A(u,i)$ represents the sum of part of the similarity values, and $S(i,v)$ represents the similarity between the ith frame and the vth frame of the frames.

9. The video summarization method according to claim 8, wherein the step of finding the minimum value from the operation results is in accordance with an equation:

$$S_{Best} = \min_v [S_A(U, v)],$$

where $S_{Best}$ represents the minimum value and $S_A(U,v)$ represents the operation results.

10. The video summarization method according to claim 1, further comprising mapping the sentences to a feature space before the step of converting the sentences into the corresponding sentence vectors.

11. The video summarization method according to claim 1, wherein the step of dividing the sentences into the clusters uses a clustering algorithm and the clustering algorithm is selected from the group consisting of a K-means clustering algorithm, a LBG algorithm, a support vector clustering algorithm and a neural network algorithm.

12. The video summarization method according to claim 1, wherein the step of computing the importance of each sentence of each cluster is based on the frequency of each term in the sentences and the location of the sentences in the video.

13. The video summarization method according to claim 12, wherein the step of computing the importance of each sentence of each cluster computes the inverse document frequency (IDF) of each term in the sentences multiplied by a term weight in accordance with the following equation:

$$IMP = \sum_j \sum_k g_{jk} \times IDF(t_k, s_j),$$

where $s_j$ represents the sentences, $t_k$ represents the term in the sentences and $g_{jk}$ represents the term weight.

14. The video summarization method according to claim 13, wherein the term weight is based on the following equation:

$$g_{jk} = \begin{cases} c, & \text{if } t_k \text{ both occurs in } s_j \text{ and in the first three sentences} \\ 1, & \text{if } t_k \text{ only occurs in } s_j \\ 0, & \text{otherwise} \end{cases}$$

where c is greater than 1.

15. The video summarization method according to claim 1, further comprising computing the importance of each sentence of the new clusters to obtain the importance of each new clusters after applying the splitting step.

16. The video summarization method according to claim 1, further comprising applying a judging step to determine whether the number of the clusters reaches the predetermined value.

17. The video summarization method according to claim 1, further comprising outputting the key frames and the key sentences to a browsing interface to present the key frames and the key sentences.

18. The video summarization method according to claim 1, wherein the key sentences are centroid sentences of the members of the set.

19. A video summarization system, suitable for extracting a plurality of key frames and a plurality of key sentences from a video to form an abstract wherein the video comprises a plurality of sentences and a plurality of frames, the video summarization system comprising:

a similarity computing apparatus, used for computing the similarity between each frame to obtain a plurality of similarity values;

a key frame extracting apparatus, used for choosing the key frames from the frames wherein the sum of the similarity values between the key frames is minimum;

a feature space mapping apparatus, used for converting the sentences into a plurality of corresponding sentence vectors and computing the distance between each sentence vector to obtain a plurality of distance values;

a clustering apparatus, used for dividing the sentences into a plurality of clusters according to the distance values wherein the clusters are members of a set, and the clustering apparatus further computing the importance of each sentence of each cluster to obtain the importance of each cluster and applying a splitting step to split a most important member with the highest importance in the cluster into a plurality of new clusters, wherein the new clusters replace the original most important member and join the set as members of the set; and a key sentence extracting apparatus, used for choosing at least one key sentence from each members of the set, wherein the sum of the importance of the key sentences is maximum.

20. The video summarization system according to claim 19, further comprising a browsing interface to present the key frames and the key sentences.

21. The video summarization system according to claim 19, wherein the clustering apparatus uses a clustering algorithm to apply the splitting step and the clustering algorithm is selected from the group consisting of a K-means clustering algorithm, a LBG algorithm, a support vector clustering algorithm and a neural network algorithm.

22. The video summarization system according to claim 19, wherein the clustering apparatus applies the step of computing the importance of each sentence of each cluster based on the frequency of each term in the sentences and the location of the sentences in the video.

23. The video summarization system according to claim 22, wherein the clustering apparatus applies the step of computing the importance of each sentence of each cluster based on computing the inverse document frequency (IDF) of each term in the sentences multiplied by a term weight and in accordance with the following equation:

$$IMP = \sum_j \sum_k g_{jk} \times IDF(t_k, s_j),$$

where $s_j$ represents the sentences, $t_k$ represents the term in the sentences and $g_{jk}$ represents the term weight.

24. The video summarization system according to claim 23, wherein the term weight is based on the following equation:

$$g_{jk} = \begin{cases} c, & \text{if } t_k \text{ both occurs in } s_j \text{ and in the first three sentences} \\ 1, & \text{if } t_k \text{ only occurs in } s_j \\ 0, & \text{otherwise} \end{cases}$$

where c is greater than 1.

25. The video summarization system according to claim 19, further comprising computing the importance of each sentence of the new clusters to obtain the importance of each new clusters after the clustering apparatus proceeding the splitting step.

26. The video summarization system according to claim 19, wherein the clustering apparatus further comprises applying a judging step to determine whether the number of the clusters reaches a predetermined value.

27. The video summarization system according to claim 19, wherein the key sentences are centroid sentences of the members of the set.

* * * * *